United States Patent [19]

Jansen

[11] Patent Number: 5,062,862
[45] Date of Patent: Nov. 5, 1991

[54] PROCESS AND APPARATUS FOR RECOVERING A PURE SUBSTANCE FROM A LIQUID MIXTURE BY CRYSTALLIZATION

[75] Inventor: Halbe A. Jansen, Oss, Netherlands

[73] Assignee: Grasso's Koninklijke Machinefabrieken N.V., Hertogenbosch, Netherlands

[21] Appl. No.: 402,989

[22] Filed: Sep. 5, 1989

Related U.S. Application Data

[63] Continuation of Ser. No. 137,677, Dec. 24, 1987, abandoned.

[30] Foreign Application Priority Data

Nov. 29, 1986 [NL] Netherlands .................. 8603314

[51] Int. Cl.$^5$ .................. B01D 9/00; C07C 7/00; C07C 7/14
[52] U.S. Cl. .................. 23/295 R; 23/296; 585/805; 585/801; 585/815
[58] Field of Search ............ 23/295 R, 296; 585/801, 585/805, 815

[56] References Cited

U.S. PATENT DOCUMENTS

| | | | |
|---|---|---|---|
| 2,750,433 | 6/1956 | Tourneau et al. | 585/815 |
| 2,848,515 | 8/1958 | Pfennig | 585/815 |
| 2,848,517 | 8/1958 | Huff et al. | 585/805 |
| 2,848,519 | 8/1958 | Corneil et al. | 585/815 |
| 2,890,239 | 6/1959 | Quigg | 585/815 |

Primary Examiner—Gary P. Straub
Attorney, Agent, or Firm—Cushman, Darby & Cushman

[57] ABSTRACT

The invention relates to a crystallization process for recovering a pure substance from a liquid mixture, a starting mixture being cooled down in a crystallization zone to form a crystal suspension from which crystals of the pure substance are recovered, wherein a) the crystal suspension is subjected to a crude preliminary separation in a (preliminary) separation zone to form a first mother liquor and a crystal mass containing relatively small particles, b) the crystal mass formed in a) is allowed to develop in a development zone at a temperature which is higher than that of the crystallization zone and lower than the melting point of the substance to be recovered, and is separated into a developed crystal mass and a second mother liquor, and c) the developed crystal mass formed in b) is separated into a third mother liquor and the intended pure substance in a separation zone, as well as to an apparatus suitable for performing said process.

3 Claims, 2 Drawing Sheets

PROCESS AND APPARATUS FOR RECOVERING A PURE SUBSTANCE FROM A LIQUID MIXTURE BY CRYSTALLIZATION

This is a continuation of application Ser. No. 07/137,677, filed Dec. 24, 1987, which was abandoned upon the filing hereof.

The invention relates to a process for recovering a pure substance from a liquid mixture, a starting mixture being cooled down in a crystallization zone to form a crystal suspension from which crystals of the pure substance are recovered.

Here a liquid mixture is understood to mean a mixture which is liquid under the working conditions. It may consist of a number of liquid components, but may also contain one or more dissolved solid components. The invention is, however, especially intended for separating mixtures of liquid organic compounds, although it is not restricted to such mixtures.

The process mentioned in the introduction is generally known. The crystals may be separated from the mother liquor by various methods. There may be two kinds of reasons for separating a particular component in the purified, preferably as pure as possible, state. For example, in the foodstuffs industry, the intention in concentrating fruit juices by the crystallization method will be to separate off water in the form of ice as purely as possible in order not to lose any concentrate. In the chemical processing industry, for example, mixtures of substances are often obtained from which it is desired to recover only one substance in as pure a state as possible. A known example is p-xylene, a substance which is used in large quantities in, for example, the preparation of plastics. In such a process, the purity plays an important part. In industry, in those cases in which ice is not involved, centrifuges are, in general, used for separating crystals from the crystal suspension which is obtained by cooling the liquid mixture down.

Various wash column systems have also been proposed for such a separation of crystals from the mother liquor, but at the same time it has not been possible to achieve a fault-free functioning of continuously operating columns. A batch-wise wash column containing a packed crystal bed is in fact known for separating ice (compare U.S. Pat. No. 3,872,009). Said column is only suitable for separating ice and has already been partially replaced by a wash column with a packed bed which can be operated continuously (compare U.S. Pat. No. 4,475,355).

The wash columns containing a packed bed have considerable advantages over centrifuges. The investment costs of centrifuges are high, while high maintenance and energy costs are also involved. In addition, they have the disadvantage that high purities can only be achieved at the expense of large quantities of wash liquid. In such processes the intended pure substance in the molten state is generally used as wash liquid.

Said disadvantages do not apply, or apply to an appreciably lesser extent, to wash columns. In the case of wash columns, difficulties may, however, occur if the crystals formed have small dimensions (for example, 50–100 μm) and/or the difference between the temperature of the mother liquor and the melting point of the pure substance to be recovered is too large. After all, said substance has, in general, to be used as wash liquid. With a large temperature jump across the wash front, the porosity will decrease as a result of crystallization of wash liquid on the cold crystals, which are fed to said wash front, in a manner such that a considerable flow resistance is produced. The crystal bed may become "clogged up" as a result of this. Instability may also be produced by heat conduction via the walls of the wash column from one side of the wash front to the other. Small crystals will result in a large drop in pressure in the wash direction of the column across the packed bed. The object of the invention is to eliminate said disadvantages by feeding larger crystals to the wash column and/or achieving a smaller temperature change at the wash front.

The invention therefore relates to a process as mentioned in the introduction which is characterized in that
a) the crystal suspension is subjected to a crude preliminary separation in a (preliminary) separation zone to form a first mother liquor and a crystal mass containing relatively small particles,
b) the crystal mass formed in a) is allowed to develop in a development zone at a temperature which is higher than that of the crystallization zone and lower than the melting point of the substance to be recovered, and is separated into a developed crystal mass and a second mother liquor, and
c) the developed crystal mass formed in b) is separated into a third mother liquor and the intended pure substance in a separation zone.

In this description, crude preliminary separation is understood to mean a separation of a crystal suspension into a mother liquor and a crystal mass in which mother liquor is still present, for example, 1–40% by weight (depending on the separation equipment used).

The crude preliminary separation of step a) can be carried out in various manners. It is possible to use a centrifuge for this purpose, in which case, for example, a thickened crystal suspension containing 60–85% by weight of crystals can be achieved, but a wash column is preferably used, for example, as described in the U.S. Pat. No. 4,475,355. Such a column may in any case also be used advantageously as a separation zone in step c).

The development zone mentioned in step b) comprises, in general, an apparatus in which the crystals have sufficient time in order to grow to a desired mean size. In this process, large crystals are produced at the expense of small crystals, which go into solution. Here a higher temperature is used than in the preliminary separation zone of step a), which is necessary in order to reduce the temperature jump from the preliminary separation to the final separation and to cause the development process to proceed more rapidly.

In the process of the invention, it is a beneficial condition that the development takes place in a suspension which is appreciably richer in crystals than the suspension which emerges from the crystallization zone (mentioned in the introduction). After all, the mean distance between crystals is smaller.

The development zone may, for example, consist of an insulated vessel which is provided with a stirring apparatus. The dimensions of said vessel are such that the mean residence time of the crystals results in the desired crystal dimensions. In certain cases, it may be advantageous to allow the preliminary separation of step a) and the development of step b) to proceed in a number of stages. In that case, zones connected in series are used; each zone then consists of a preliminary separation apparatus and a development apparatus. It is also possible to perform only the preliminary separation in a number of preliminary separation apparatuses connected in series.

An increase of the temperature in the development zone of step b) may be achieved by introducing a certain quantity of melt of the component to be separated. This may, for example, be carried out by tapping off a portion of the suspension, heating it up until the crystals present therein have been dissolved and then returning the heated liquid to the preparation apparatus again. However, any method can be used in which energy is supplied to the development zone. Preferably, pure melt of the component to be separated, which is obtained after step c), will be supplied.

The invention is explained in more detail by reference to the drawings.

Figure 1:
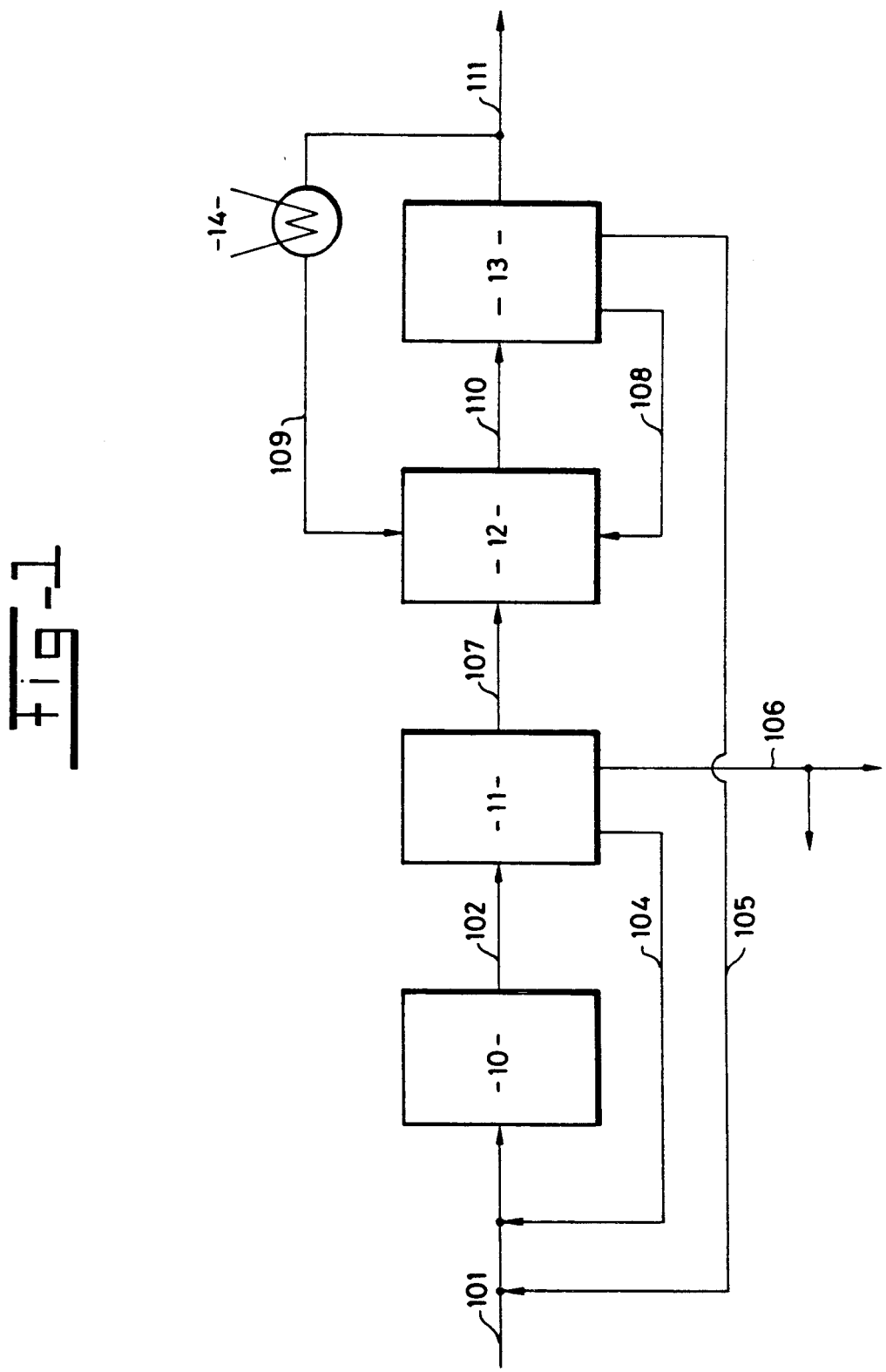
FIG. 1 shows a diagram of a known process for separating a substance such as p-xylene from the reaction mixture in which it is present.

In FIG. 1, the current of starting material 101 (which originates from a chemical reactor) is fed to a crystallization zone 10. In said zone, the intended component is caused to crystallize by cooling it down. The residual liquid phase is termed mother liquor. The crystallization zone may (on energy grounds) consist of different crystallization apparatuses in series. The product of the crystallization zone is a suspension of crystals in mother liquor. Said crystal suspension 102 is supplied to a separation zone in which the crystals are separated from the mother liquor. Said separation zone consists of a first centrifuge step 11, a mixing vessel 12 and a second centrifuge step 13.

In the first centrifuge step (for example, a Burt centrifuge), the material supplied is split up into two filtrate currents 104 and 106 and a thickened crystal mass 107. The largest filtrate current is the mother liquor current 106 which, at least for the major part, is returned in the case of the p-xylene process to the chemical reactor (not shown). The filtrate current 104 which is tapped from the centrifuge at a point where little filter cake has yet formed, still contains a quantity of small crystals and is therefore returned to the crystallizer 10 again. The thickened suspension 107 is fed into a mixing vessel 12 where a pumpable suspension 110 is produced by adding the filtrate current 108 from the second centrifuge step 13 and adding a current of molten final product 109. Said current 109 is the greater, the greater the purities it is desired to achieve. The product crystals in the returned current are melted by means of a heat exchanger 14.

The suspension 110 from the mixing vessel 12 is pumped to the second centrifuge step. From said second centrifuge step 13 there emerge, in addition to the filtrate current 108 already mentioned and the returned product current 109, also another current 105 having the same composition as current 108 and the final product current 111 which, after the crystals present have been melted, yields the product with the desired purity. Current 105 is necessary in order to prevent an accumulation of undesired components in the mixing vessel 12. Because of the relatively high concentration of the component to be extracted, the current 105 is returned to the crystallization zone 10.

Figure 2:
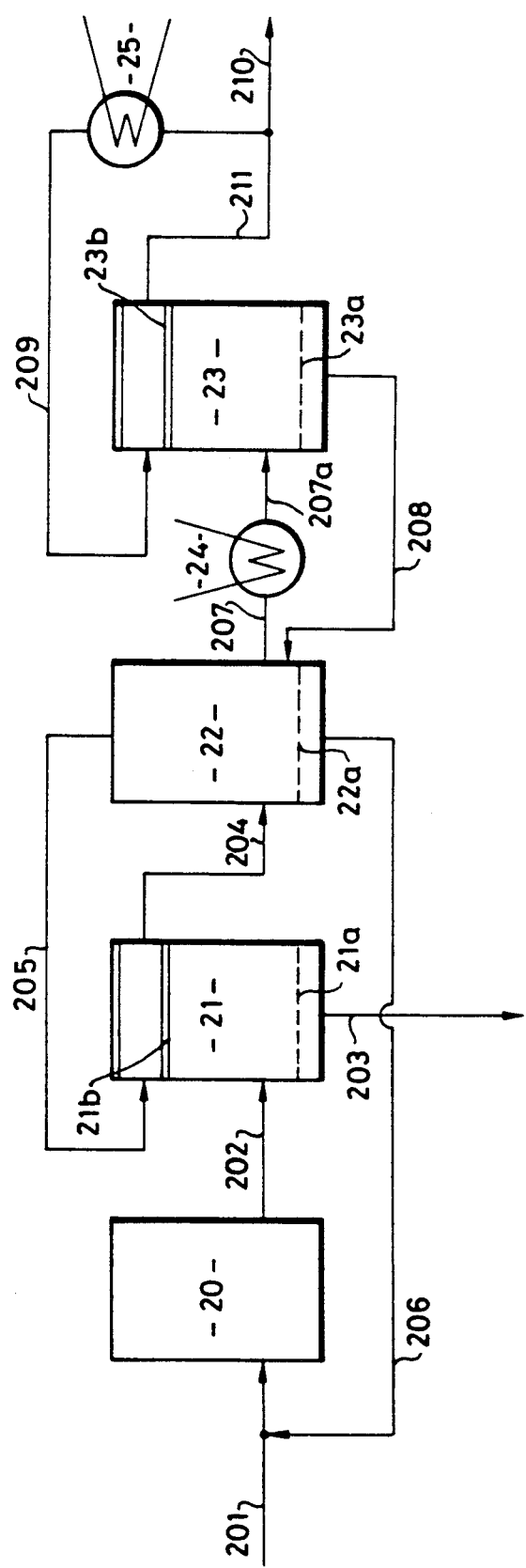
FIG. 2 shows a diagram of the process according to the invention for the same separation.

In the process according to the invention as shown in FIG. 2, the current of starting material 201 is supplied to the crystallization zone 20. The crystal suspension 202 formed in the crystallization zone is supplied to the preliminary separation zone 21. Said zone is preferably a wash column with a packed bed, the wash and rinsing liquid not consisting of the melt of the purified desired component, but of the suspension such as is present in the development zone 22.

From the preliminary separation zone 21 (wash column containing a packed bed), the (first) filtrate mother liquor 203 is removed via the filter 21a. After disintegration by the disintegration apparatus 21b, the packed crystal bed is rinsed away with crystal suspension 205 from the development zone 22 and returned as crystal suspension 204 to the development zone 22. The liquid from the crystal suspension 205 is used in the wash column 21 not only as rinsing liquid but also as wash liquid. In wash column 21 there is no need for a sharp wash front to be produced, i.e. no complete displacement of the mother liquor present into the current of crystal suspension 202 is necessary. A quantity of a few per cent of mother liquor can be entrained with the disintegrated crystal mass and fed with the rinsing suspension 205 via the crystal suspension current 204 into the development zone 22. Here a "crude" preliminary separation is therefore involved.

The development zone 22 comprises a development vessel which is provided with a filter 22a through which filtrate 206 is removed and, optionally, is returned to the current of starting material 201. The crystal suspension 207 from the development vessel 22 is fed to the separation zone 23 which comprises a wash column. In this process, however, the suspension passes through a heat exchanger 24 in which a portion of the crystals melts because the temperature is increased. The crystal suspension 207a with an increased temperature is separated from the mother liquor 208 in the wash column 23 via the filter 23a.

The mother liquor 208 with an increased temperature with respect to 207 is recirculated to the development vessel 22. It will be clear that, in the development vessel 22, a cold supply via the cold crystals from the crystallization zone and a heat supply via the mother liquor 208, the temperature of which has been increased, are involved. The temperature in the development vessel will therefore lie between the temperature in the crystallization zone 20 (and, therefore, the crystal suspension current 202) and the temperature of the current 207a (equal to the filtrate current 208 from the wash column 23).

In the wash column 23, a wash front is formed between the filter 23a and the disintegration apparatus 23b. The packed crystal mass is washed with the melt of the purified substance to be recovered and, after disintegration, is rinsed away with a melt of the component to be recovered in the purified state (via current 209). The crystal suspension rinsed away emerges as current 211 from the top of the wash column 23. A portion 210 is tapped off as purified component to be recovered and another portion is recirculated, after the crystals have been melted by the heat exchanger 25, as wash and rinse liquid 209. The wash column used here is described in detail in the U.S. Pat. Nos. 4,475,355 and 4,481,169.

The rinsing current 204 from the preliminary separation zone (wash column) 21 is supplied to the development zone 22. The development zone 22 consists, for example, of an insulated vessel which is very vigorously stirred, for example, a special development vessel which is marketed by Grenco.

From the above it will be clear that a wash column with a packed crystal bed is preferably used as preliminary separation zone in step a) according to the invention and a crystal suspension originating from the development zone is used therein as wash and rinsing liquid.

In the process according to the invention, the crystal mass formed in step b) (development zone) will be heated before it is treated in the separation zone of step c). The concentration of the component to be recovered in the liquid phase is at the same time regulated by means of supplying heat, for example via heat exchanger 24 in FIG. 2, to the suspension current from the development zone (22) to the separation zone (wash column 23). As a result of this a portion of the product crystals melts, as a result of which the concentration of the component to be recovered in the liquid is increased.

The third mother liquor, obtained in step c) (filtrate current 208 in FIG. 2), is preferably returned to the development zone. Another method of controlling the concentration of the component to be recovered in the development zone is a partial return of the pure component to be recovered (current 209 in FIG. 2). As a result of the higher loading of the wash column 23 in the last-mentioned case, the first-mentioned process is to be preferred.

In the process according to the invention, it is, however, also possible to heat at least one of the currents fed to the development zone (current 208 or 204 in FIG. 2). In principle, any method can be used in which energy is supplied to the development zone.

As a result of the above-mentioned measures, the concentration of the component to be recovered in the liquid and the equilibrium temperature of the liquid associated therewith can be favourably adjusted in the development zone, as can the fraction by volume of the crystals. The object of a development zone is, after all, to melt down small crystals and at the same time to cause larger crystals to grow. The European Patent Application 97,405 (corresponding to the Dutch Patent Application 8,202,517) proposes to locate a development vessel directly connected downstream of the final section of a co-current crystallization apparatus comprising several steps. The conditions for crystal growth and, consequently, also of the development process are, however, then poor (low temperature, high viscosity). According to the invention, these problems can be overcome by causing the development to take place at a higher temperature.

The optimum concentration of the component to be recovered in the mixture of components is determined not only by-the optimum conditions for the development process. After all, the equilibrium temperature, i.e. the temperature at which the solid phase (the crystals) and the liquid phase (the mother liquor) are in thermodynamic equilibrium with each other, is associated with the concentration. If, when a wash column is used as separation zone of step c), washing is carried out with the molten purified component to be recovered (current 209 in FIG. 2), approximately the temperature of the melting point of the said component prevails on one side of the wash front in said separation zone, while, on the other side, the temperature corresponds to that of the suspension current (the heated current 207a in FIG. 2) originating from the development zone. If the temperature jump at said wash front is too large, problems may arise due to wash liquid crystallizing out at and between the colder crystals of the packed bed which the wash front passes. This may lead to such a reduction in the porosity that excessive pressures would be necessary to force the wash liquid through the packed bed; "clogging up" of the wash column may therefore occur. In addition, a large temperature change across the wash front may have a bad effect on the stability of said front. On the other hand, a relatively high temperature of the suspension current originating from the development zone (current 207/207a in FIG. 2) has the disadvantage that the concentration of the component to be recovered in the mother liquor current (current 208 in FIG. 2) is also relatively high and, of course, also the temperature.

If a wash column with a packed bed is used as separation zone in step c), a portion of the pure substance recovered is at the same time preferably used in the molten state as wash liquid.

The fraction by volume of the crystals in the development zone of step b) can be adjusted by regulating the removal of the (second) mother liquor (filtrate current 207 in FIG. 2). In general, the fraction by volume is preferably 30–40%, which is a compromise between the rate of mass transfer during the development (the smaller the distance between the crystals, the more rapid the development) and the pumpability of the crystal mass. At relatively high crystal concentrations, problems may arise in relation to the pumpability.

A purity of more than 99.9% can be achieved by using the process according to the invention.

As has already been stated, it may be beneficial in certain cases to arrange for the preliminary separation zone of step a) and/or the development zone of step b) to consist of more than one preliminary separation apparatus and/or development vessel. Referring to FIG. 2, for example, an additional preliminary separation apparatus may be sited between development vessel 22 and wash column 23. This may be necessary if the crystals emerging from the development vessel 22 are indeed large enough but are still at such a low temperature with respect to the melting point of the purified component to be extracted that the temperature gradient resulting therefrom across the wash column would lead to the clogging up of the wash column by excessive crystallization of the wash liquid of the wash front.

The invention also relates to an apparatus suitable for performing the process described above which successively comprises (the reference numerals relate to the figure and serve the purpose of explanation but do not imply any restriction): a crystallization zone (20), a preliminary separation zone (21), a development zone (22) and a separation zone (23), the crystallization zone (20) containing a starting material supply (201) and being connected via a pipe (202) to the preliminary separation zone (21), the preliminary separation zone (21) containing a drain for (the first) mother liquor (203) and being connected via a pipe (204) to the development zone 22), the-development zone containing a drain for (the second) mother liquor (206) and being connected via a pipe (207, 207a) to a separation zone (23), and the separation zone (23) containing a drain for (the third)-mother liquor (208) and a drain for pure substance (211, 210).

In the apparatus according to the invention it is preferable that the development zone (22) is connected to the preliminary separation zone (21) via a pipe for returning crystal suspension (205), that the drain pipe (206) is connected to the supply (201), that the drain pipe (208) debouches into the development zone (22) and that a heat exchanger is disposed in the pipe (207, 207a).

The reasons for the preferences mentioned in relation to the apparatus described above emerge clearly from the discussion of the process according to the invention.

Exemplary embodiment

The separation of p-xylene from a mixture of isomeric xylenes was performed according to a process which corresponds to the process discussed with reference to FIG. 2. The reference numerals used in this example therefore also relate to FIG. 2.

A mixture of isomeric xylenes which contains 23% by weight of p-xylene is supplied to a crystallization apparatus (20) in a quantity of 100 m³/h (87 tonnes/h) (current 201). In the crystallization apparatus, the mixture is cooled down to $-60°$ C., as a result of which 13.4 tonnes/h of p-xylene crystallizes out (including the effect of the drainage current 206). The crystal suspension, which contains approximately 15% by weight of crystals, is fed to the preliminary separation apparatus (wash column 21). The breakthrough (mother liquor which accompanies the crystals) is approximately 2% by weight. The filtrate from the separation zone (21) is the mother liquor (203) which no longer contains any product crystals. Said current is removed in a quantity of 73.8 tonnes/h. The product crystals are rinsed away together with the breakthrough mother liquor by rinsing current (203)-from the head of the wash column (21). This suspension is supplied to the development vessel (22). The temperature in the development vessel is adjusted to $-10°$ C., which corresponds to a p-xylene concentration in the liquid of 53% by weight. The crystals are heated up from $-60°$ C. to $-10°$ C. by means of the heat exchanger (24). This achieves the result that the temperature and, consequently, also the concentration of p-xylene in the liquid phase remains constant. The development vessel (22) contains approximately 40% by weight of crystal mass. The residence time in the development vessel is chosen such that the mean crystal size as a result of development increases from 50-100 μm to 100-250 μm. The suspension is now suitable for undergoing a complete separation of crystal phase and liquid phase in wash column (23). For this purpose, 44.6 tonnes/h of suspension are fed to the wash column (23) from the development vessel (22). This current contains 17.8 tonnes/h of p-xylene crystals, a portion (4.6 tonnes/h) of which is melted in the heat exchanger (24) and returned to the development vessel (22) via current 208. The remaining crystals are separated in the wash column (23) and after being melted in the circuit, leave the system via heat exchanger (25) as virtually pure p-xylene liquid. The filtrate (31.6 tonnes/h) from the wash column (23) (i.e. current (208)) is returned to the development vessel (22).

I claim:

1. A process for recovering a pure organic substance from an organic liquid mixture, a starting mixture being cooled down in a crystallization zone at a temperature substantially below the freezing point of the pure organic substance to form a pumpable crystal suspension, from which crystals of the pure substance are recovered, wherein
   a) the crystal suspension is subjected to a crude separation by feeding it into a first wash column to form a first mother liquor and an upwardly moving crystal bed,
   removing crystals together with a few percent of the mother liquor at the top of the crystal bed in the column as a crystal mass, the small amount of mother liquor being due to imperfect washing of the crystal bed,
   b) the crystal mass from step a) is subsequently transported to a ripening zone wherein the crystal mass is agitated at a temperature which is higher than that of the crystallization zone and lower than the melting point of the pure substance to be recovered,
   a suspension is removed overhead and is introduced into an upper portion of the first wash column of step a) and is used as a wash and transport liquid,
   a small stream (bleed stream) of second mother liquor is separated off, and
   a crystal suspension containing substantially larger crystals than those in the crystal mass formed in step a) is removed from a lower portion of the ripening zone,
   c) the crystal suspension containing substantially larger crystals from step b) is transported to a second wash column wherein the temperature of the crystals which move through the second wash column increases from the temperature of the ripening zone to the temperature of the melting point of the pure substance,
   the crystal suspension is separated into a third mother liquor having substantially the same composition as the second mother liquor formed in step b), which is at least partially returned to the ripening zone of step b) and a washed crystal mass is recovered from an upper portion of the second wash column, and
   d) a portion of said crystal mass from step c) is heated and returned as a wash and transport liquid to the top of the second wash column.

2. The process according to claim 1, wherein heat is supplied to the ripening zone of step b)

3. The process according to claim 1, wherein the crystal suspension originating from the ripening zone of step b) is heated before it is transported to the second wash column of step c).

* * * * *